United States Patent [19]

Emerson

[11] 4,032,168
[45] June 28, 1977

[54] HANDLEBAR RISER AND SETBACK WITH DASHBOARD FOR MOTORCYCLES

[75] Inventor: Donald E. Emerson, Palmdale, Calif.

[73] Assignee: Space-Age Control, Inc., Paramount, Calif.

[22] Filed: Feb. 2, 1976

[21] Appl. No.: 654,061

[52] U.S. Cl. .............................. 280/279; 74/551.8; 74/551.1; 296/78.1
[51] Int. Cl.² ......................................... B62K 21/12
[58] Field of Search ................ 296/78.1; 74/551.1, 74/551.3, 551.8; 280/263, 280, 274, 279, 276

[56] References Cited

UNITED STATES PATENTS

| 2,492,283 | 12/1949 | Hazzard | 74/551.1 |
| 3,521,904 | 7/1970 | Sheffer | 280/279 X |

*Primary Examiner*—Philip Goodman
*Attorney, Agent, or Firm*—Huebner & Worrel

[57] ABSTRACT

A device for raising and setting back the handlebar of a motorcycle. The device is comprised of two spaced mounting plates which are secured to the handlebar supporting means and which extend rearwardly therefrom to carry the handlebar. A dashboard extends across the space between the plates forwardly of the handlebar.

7 Claims, 4 Drawing Figures

HANDLEBAR RISER AND SETBACK WITH DASHBOARD FOR MOTORCYCLES

BACKGROUND OF THE INVENTION

Many motorcycles are made with the handlebar positioned so that the rider must bend forwardly in order to properly grip the handlebar. If the handlebars were made longer, the additional length would amplify the vibration in them and cause discomfort and steering difficulty.

Other handlebar risers and setbacks have been provided in the prior art but they tend to be in the nature of jury rigs and are typically comprised of elongated connectors which also tend to amplify the vibration. The present invention is of rigid construction and of such a nature as to not amplify any road vibration.

SUMMARY OF THE INVENTION

The present invention provides a handlebar riser and setback, including a dashboard, which is rigid, strong, easy to install and which maintains the integrity of the drive system.

Accordingly, it is an object of the invention to provide an improved handlebar riser and setback which includes a dashboard. The dashboard means for attachment of motorcycle fuses, switches, cigarette lighter and map light, for example.

It is another object of the invention to provide a device, as described in the preceding paragraph, which permits the changing of oil and fork springs without removal of the handlebar.

It is still another object of the invention to provide a device, as described in the preceding paragraphs, that improves the appearance of the motorcycle, the comfort of the rider, and the performance of the motorcycle. The riser and setback, according to the invention, is adapted to set the handlebar back 2 or more inches and raise the handlebar three-quarters of an inch or more. This permits the rider to sit in an erect position rather than leaning forward, and is particularly beneficial in providing a comfortable ride for relatively long trips.

It is a further object of the invention to provide a device, as described in the preceding paragraphs, which permits complete movement of the handlebar for turning without the handlebar or the mirrors making contact with the fairing. The device can be modified without departing from the principles of the invention for substantially all types of motorcycles.

It is another object of the invention to provide a device, as described in the preceding paragraphs, which does not require the location or configuration of the dampener knob to be changed and which permits it to function as originally installed.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENTS

Figure 1:
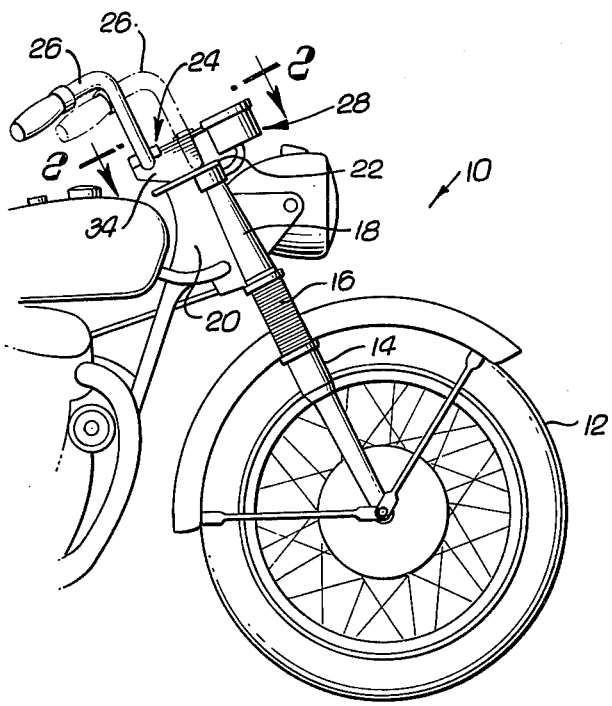
FIG. 1 is a fragmentary side elevational view of a motorcycle embodying the present invention.

Referring again to the drawings, there is shown in FIG. 1 the forward end of a motorcycle, generally designated as 10, having a forward wheel 12 secured within a fork 14, carrying a pair of springs 16. An upper portion 18 of the fork is secured to the body 20 of the motorcycle so as to be rotatable for steering. Secured to the upper end of the fork is an upper fork plate 22, rotatable with the fork and serves as a handlebar supporting means so that rotation of a handlebar, as 26, and the plate 22 causes turning of the wheel 12.

Secured to the plate 22 is a handlebar mounting means, generally designated as 24, and by which the handlebar 26 is joined to the plate 22. Forwardly of the plate 22 and independently secured to the motorcycle fork in an instrument mounting casing 28 which carries a speedometer 30 and a tachometer 32.

Figure 2:
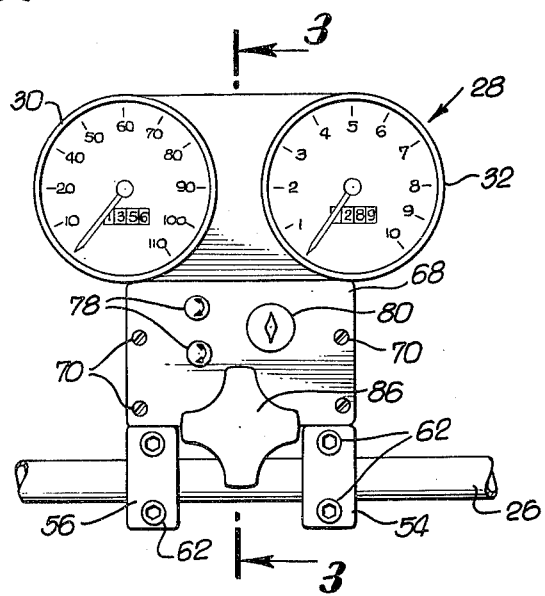
FIG. 2 is a fragmentary view of the motorcycle showing the invention in plan, taken along the lines 2—2 of FIG. 1.
Figure 3:
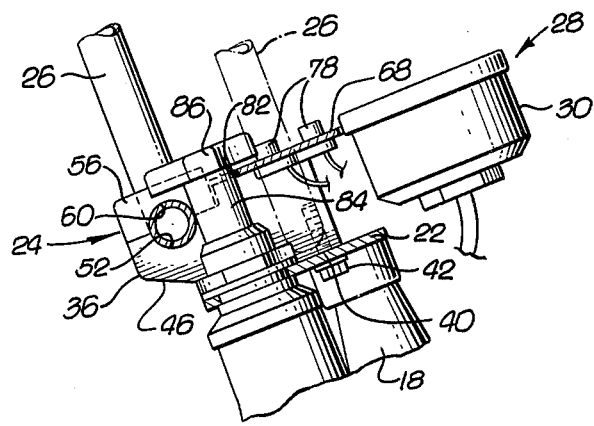
FIG. 3 is a partially cross-sectional view, taken along the lines 3—3 of FIG. 2.
Figure 4:
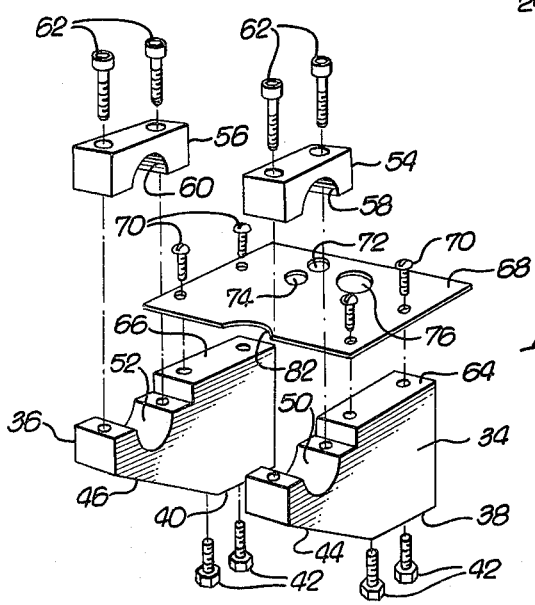
FIG. 4 is an exploded view of the device according to the invention.

The handlebar mounting means 24, as shown in exploded view in FIG. 4, is comprised of two parallel laterally spaced generally upright side plates 34 and 36 having forward lower surfaces 38 and 40, respectively, abutting the plate 22, as shown in FIGS. 1 and 3, being secured thereto by bolts 42. The plates are relieved rearwardly from surfaces 38 and 40 to form tapering undersurfaces 44 and 46, respectively. Above the tapering surfaces, adjacent the rearward end of the plates, are semicylindrical cutaway portions 50 and 52 adapted to receive the lower half of the handlbar. Removably securable to the upper rear portion of the plates are handlebar clamping members 54 and 56, having semicylindrical portions 58 and 60, respectively, complementary with the portions 50 and 52 for securing the handlebar to the plates 34 and 36 by means of Allen screws 62. Forwardly of the members 54 and 56 and at a lower level on the plates 34 and 36 are upper forward flat surfaces 64 and 66 to which a substantially rectangular dashboard plate 68 is secured by cap screws 70. The dashboard 68 has openings 72, 74 and 76 which, as shown in FIG. 2, are adapted to receive fuse holders 78 and a lighter 80. The rearward end of the plate has a cutaway portion 82 which is adapted to accommodate a stem 84 of a dampener knob 86. The dampener knob is secured to the fork and is used for steering adjustments. Other fittings, such as switches and map lights, may be also fitted on the dashboard.

For installation of the handlebar mounting device 24 it is necessary to remove the original handlebar mounting means which typically position the handlebar directly above the fork plate. After the handlebar has thus been removed, the plates 34 and 36 are secured to the fork plate 22 and the handlebar is secured in the semicylindrical portions 50, 52, 58 and 60. The fuses, for example, are removed from their usual position and the wires are soldered and extended so that the fuse holders may be secured to the dashboard. In a similar manner, the wire to the lighter may be attached to the dashboard.

From the foregoing it may be clearly seen that the handlebar is moved rearwardly and upwardly from its usual position just above the plate 22 and is secured in a rigid device which permits a full turning of the handlebar without the handlebar, mirrors attached thereto, or the handlebar mounting means 24 making contact with the motorcycle fairing or any other parts of the motorcycle body and so as to provide a comfortable gripping position for the rider.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific form shown or uses mentioned except as defined in the accompanying claims, wherein various portions have been separated for clarity of reading and not for emphasis.

I claim:

1. In a motorcycle having a handlebar and handlebar supporting means,
   the improvement comprising:
   mounting means for securing the handlebar on the handlebar supporting means,
   said mounting means being adapted to set the handlebar back from and above the handlebar supporting means, and
   a dashboard on said mounting means,
   said dashboard extending forwardly on said mounting means and being comprised of a plate spaced upwardly from the handlebar supporting means and 2. The invention according to claim 1 in which:
   said mounting means are formed of two laterally spaced, generally upright plate members,
   said plate members being securable adjacent their forward ends to said handlebar supporting means,
   said dashboard being secured to the upper, forward ends of said plate members and extending laterally across the space between the plate members and forwardly thereof,
   said plate members having two laterally extending, aligned openings adjacent their upper and rearward ends for receiving the handlebar therein,
   said aligned openings being formed on their upper portions in two removable members forming upper rear end portions of said plate members,
   said removable members extending rearwardly of and at a higher level than said dashboard,
   said plate members having rearward lower edges tapering upwardly below said aligned openings.

3. In a motor cycle having a handlebar and handlebar supporting means,
   the improvement comprising:
   mounting means for securing the handlebar on the handlebar supporting means,
   said mounting means being adapted to set the handlebar back from and above the handlebar supporting means, and
   a dashboard on said mounting means,
   said mounting means including two laterally spaced, generally upright plate members,
   said plate members being securable adjacent their forward lower ends to said handlebar supporting means,
   said plate members having two laterally extending, aligned openings adjacent their upper and rearward ends for receiving the handlebar therein,
   said dashboard being a plate securable to the upper, forward ends of said plate members and being adapted to extend across the space between the plate members.

4. The invention according to claim 3 in which:
   said aligned openings are formed on their upper portions in two removable members forming upper rear end portions of said plate members.

5. The invention according to claim 4 in which:
   said removable members extend rearwardly of said dashboard and extend to a level higher than said dashboard.

6. The invention according to claim 3 in which:
   said plate members have rearward lower edges tapering upwardly below said aligned openings.

7. The invention according to claim 3 in which:
   said dashboard extends forwardly beyond said plate members.

* * * * *

UNITED STATES PATENT OFFICE
CERTIFICATE OF CORRECTION

Patent No. 4,032,168            Dated June 28, 1977

Inventor(s) Donald E. Emerson

It is certified that error appears in the above-identified patent and that said Letters Patent are hereby corrected as shown below:

The address of the assignee, Space-Age Control, Inc., Palmdale, Calif.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*